March 19, 1935.  N. H. NELSON  1,995,155
WHEELED TOY
Filed Aug. 14, 1933  2 Sheets-Sheet 1
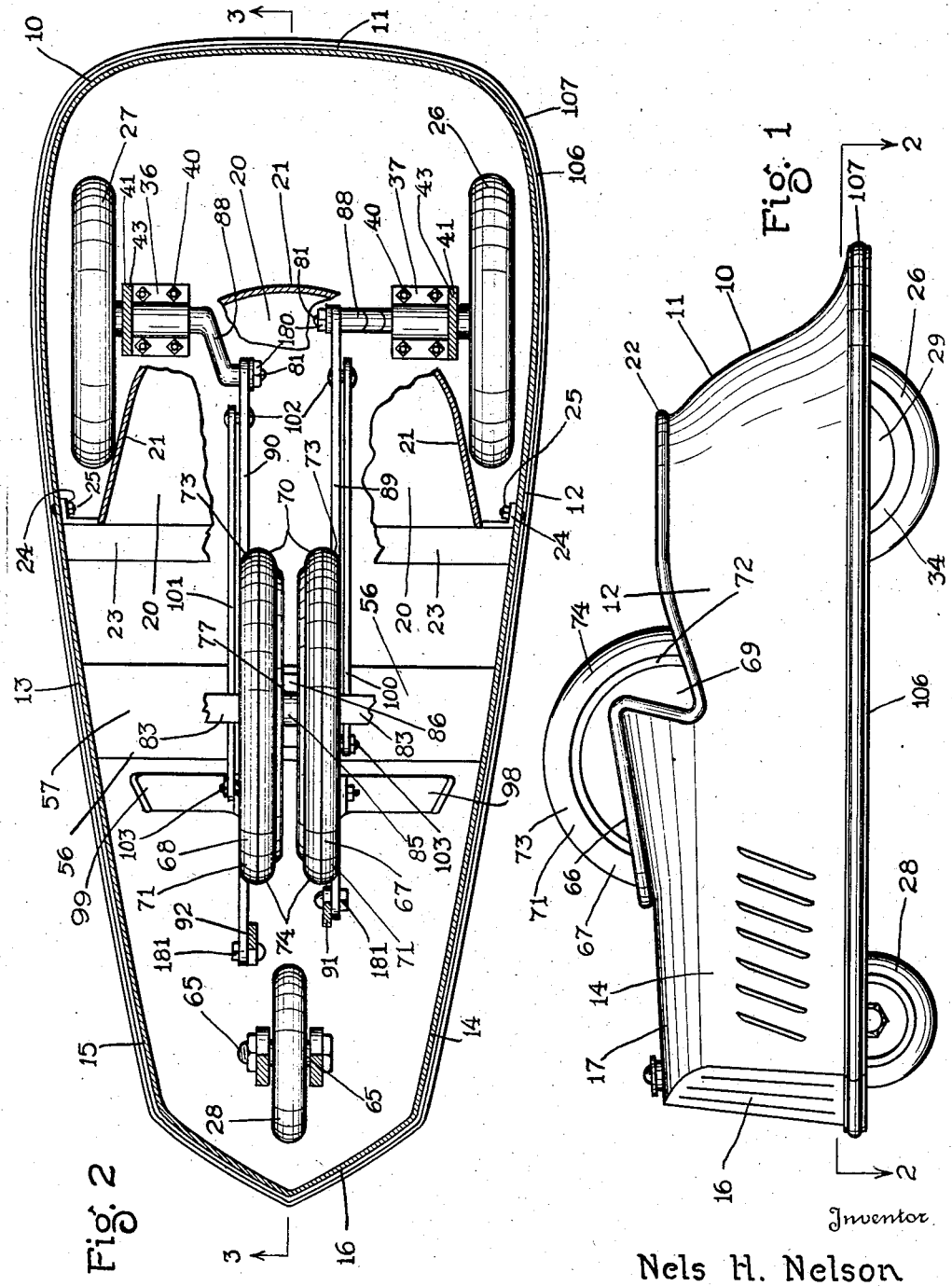
Inventor
Nels H. Nelson
By Caswell & Lagaard
Attorneys March 19, 1935.  N. H. NELSON  1,995,155
WHEELED TOY
Filed Aug. 14, 1933   2 Sheets-Sheet 2
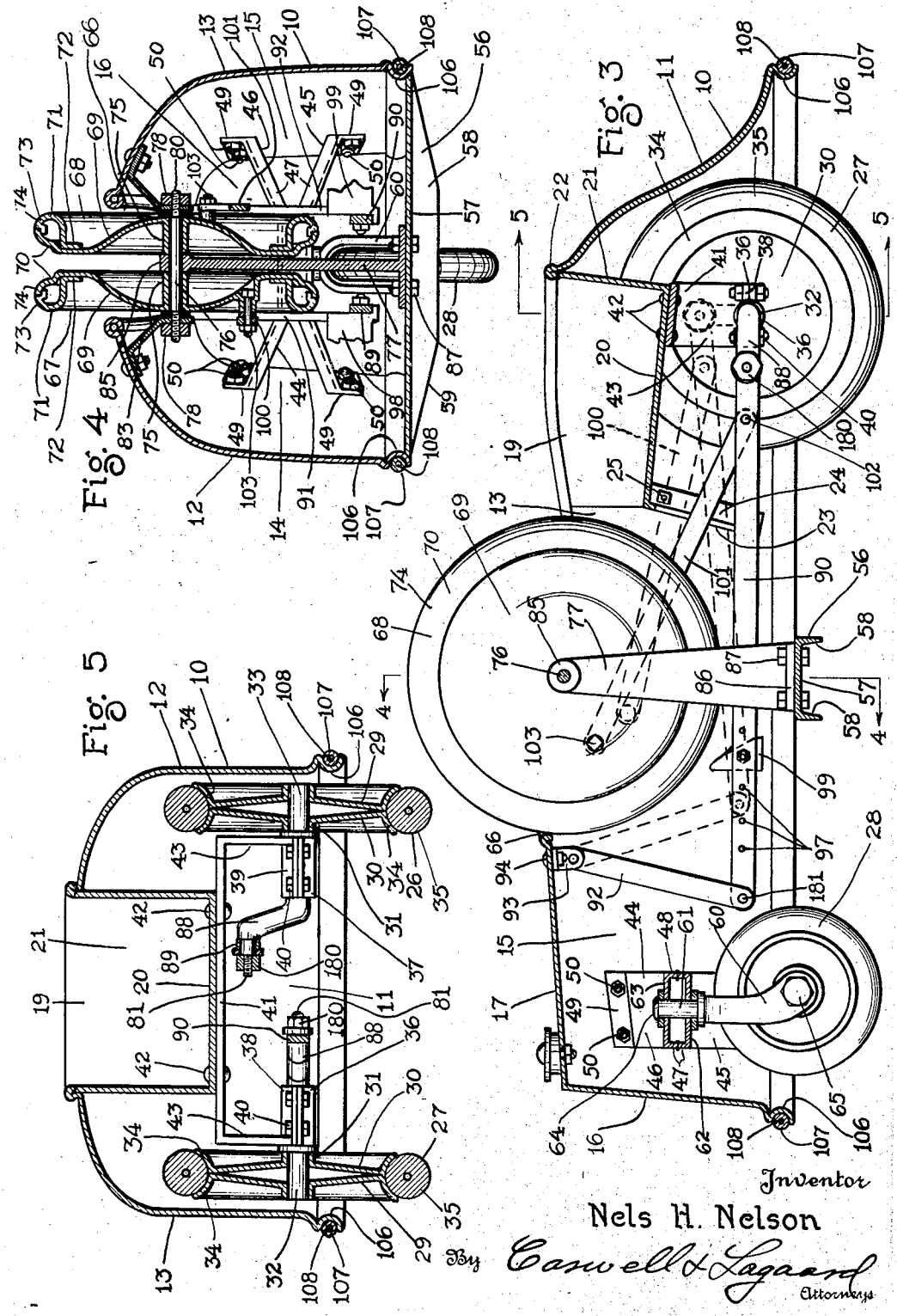
Inventor
Nels H. Nelson
By Caswell & Lagaard
Attorneys Patented Mar. 19, 1935

1,995,155

UNITED STATES PATENT OFFICE 1,995,155

WHEELED TOY

Nels H. Nelson, Minneapolis, Minn., assignor of one-half to G. E. Norberg, St. Paul, Minn.

Application August 14, 1933, Serial No. 684,960

13 Claims. (Cl. 208—32)

My invention relates to wheeled toys and particularly to self-propelled vehicles capable of being used by children for amusement and transportation.

An object of the invention resides in providing a vehicle having a supporting structure and driving wheels carried thereby and in providing hand operated means for propelling said driving wheels.

Another object of the invention resides in providing foot operated means operating in conjunction with said hand operated means for further propelling the vehicle.

An object of the invention resides in constructing one of the wheels of the vehicle with a crank and in providing two links connected therewith and having different lines of action by means of which the crank may be rotated to procure propulsion of the vehicle.

A feature of the invention resides in providing a foot pedal for operating one of said links and a hand engaged member for operating the other of said links.

An object of the invention resides in employing a hand wheel for operating one of the links.

Another object of the invention resides in arranging the hand wheel in a vertical position with its axis transversely of the vehicle.

A feature of the invention resides in providing the vehicle with a seat forwardly of the driving wheel and in disposing said hand wheel forwardly of the seat.

Another object of the invention resides in providing a swinging arm at the forward portion of the vehicle and to which one of the links is connected.

An object of the invention resides in connecting the other link to the hand wheel at the lower portion thereof.

A feature of the invention resides in pivoting said second named link to the hand wheel a distance from the center of the hand wheel greater than the length of the arm of the crank.

An object of the invention resides in pivoting one of said links to the crank of the driving wheel and the other of said links to the first named link.

Another object of the invention resides in providing separate hand wheels and pedals for individually operating the two drive wheels by means of which steering of the vehicle can be procured by the proper manipulation of the hand wheels and pedals.

A still further object of the invention resides in providing a vehicle in which steering can be accomplished solely through the propelling mechanism of the vehicle.

Other objects of the invention reside in the novel combination and arrangement of parts and in the details of construction hereinafter illustrated and/or described.

In the drawings:

Fig. 1 is a side elevational view of a wheeled vehicle illustrating an embodiment of my invention.

Fig. 2 is a plan sectional view of the structure shown in Fig. 1 taken on line 2—2 of Fig. 1 and drawn to a larger scale.

Fig. 3 is a longitudinal sectional view taken substantially on line 3—3 of Fig 2.

Fig. 4 is a cross sectional view taken on line 4—4 of Fig. 3.

Fig 5 is a cross sectional view taken on line 5—5 of Fig. 3.

Heretofore in the propulsion of vehicles by a crank and link, it has been customary to apply the power through two sets of cranks to a single axle by means of mechanism alternately operated by the feet of the operator. Such mechanism does not permit of steering the vehicle. The present construction provides a simple and practical device by means of which separate power transmission apparatus is provided for each drive wheel, whereby the said driving wheels may be independently operated to procure steering of the vehicle and further in which the dead center for each crank is eliminated by the use of both hand and foot operated transmission means.

My invention proper comprises a body 10 which is constructed in the shape of the body of a motor vehicle, being provided with a back 11 and sides 12 and 13. These sides lie in continuation of hood-like portions 14 and 15 terminating in an imitation radiator 16 disposed at the forward portion of the body. A hood 17 covers the forward portion of the body while the back 11 at the rear slopes upwardly to form an enclosure. By means of this construction an opening 19 is provided in the body 10 through which access to the interior of the body is had and in which the occupant is stationed, which opening is bounded by a marginal portion 22. A seat 20 is disposed within the interior of the body proper and is constructed with a U-shaped back rest 21 connected to the marginal portion 22 of the back 11 and sides 12 and 13. This seat is further constructed with a drop board 23 projecting downwardly therefrom and extending across two sides 12 and 13. This seat structure may be further attached to the sides 12 and 13 through ears 24 formed on the board 23, which ears are bolted to the sides 12 and 13 through bolts 25. The upper portion of the back rest 21 may be welded or otherwise secured to the marginal portion 22 of back 11 and sides 12 and 13.

For the purpose of preventing injury to adjoining objects from the striking of the vehicle against the same, the lowermost portion of the body 10 is constructed to form a circumferentially extending channel 106. In this channel is disposed a rubber bumper 107 which may consist of a rubber tube having a wire 108 extending through the same by means of which said bumper is secured within the channel 106.

The vehicle body is supported at the rear through two rear wheels 26 and 27. These wheels are preferably of the rubber tired type and are constructed with disks 29 and 30 arranged face to face and formed with hubs 31 at their centers by means of which said disks may be attached to two stub axles 32 and 33. Such hubs are preferably welded or otherwise rigidly secured to said axles. The outer edges of the disks 29 and 30 are constructed with flanges 34 which form rims for the reception of rubber tires 35 carried thereby.

The two stub axles 32 and 33 are journaled in two bearings 36 and 37 which are provided with caps 38 and 39 adapted to be bolted thereto through bolts 40. The two bearings 36 and 37 are supported through a transverse frame member 41 which is riveted to the seat 20 through rivets 42. This frame member is constructed with downwardly extending legs 43 which are welded to the caps 38 and 39 of bearings 36 and 37. By means of this construction, the bearings are rigidly supported relative to the body 10 of the vehicle and the two wheels 26 and 27 are journaled for rotation.

At the forward portion of the body 10 where the hood-like members 14 and 15 are located is provided a transverse frame member 44. This frame member consists of two U-shaped channel sections 45 and 46 of which the flanges 47 at the intermediate portion thereof are welded together to form a box-like structure 48 at the center of the frame member. Ears 49 are turned up at the ends of these channel sections which are bolted to the portions 14 and 15 of the body through bolts 50. The transverse frame member 44 provides a support for a front wheel 28 situated at the forward portion of the vehicle.

Near the center of the body 10 is provided another transverse frame member 56 which is channel shaped, being formed with a web 57 and flanges 58 depending therefrom. This frame member is secured to the lowermost portion of the sides 12 and 13 of the body 10 through welding. The ends of the flanges 58 of this frame member are cut down as indicated at 59 to give the said construction a neat and attractive appearance.

The front wheel 28 is rotatably mounted in a fork 60 which is formed at its upper end with a trunnion 61. An axle 65 passes through the end of the fork 60 and the wheel 28 by means of which the said wheel is journaled. The trunnion 61 passes through the two webs 62 and 63 of the channel sections 45 and 46 and by means of which the box-like structure 48 is formed and is journaled for rotation in these parts of the transverse frame member 44. The upper end 64 of the trunnion is riveted over to hold the said trunnion in place. The front wheel 28 serves as a caster wheel and is arranged so that the fork 60 thereof extends rearwardly whereby the axle of the said steering wheel is disposed rearwardly of the axis of the trunnions 61. By means of this construction the wheel 28 operates as a caster wheel causing the vehicle to travel in the proper direction when motor power is applied to the respective driving wheels as will be presently described in detail.

In the center of the hood 17 is formed a longitudinally extending slot 66 through which two vertically disposed hand wheels 67 and 68 extend. These hand wheels are shown in detail in Fig. 4. Inasmuch as both of these hand wheels are identical in construction, only the hand wheel 68 will be described in detail. This wheel consists of a disk 69 which is formed at its outer end with a curved lip 70. A rim 71 constructed from a separate piece of metal is formed with a flange 72 and a curved portion 73 cooperating with the lip 70 to form a circular hand grip 74 by means of which the said wheel may be grasped by the operator and manually oscillated about its axis. The disk 69 is formed at its center with a hub 75 which is rotatably mounted on a fixed shaft 76. For supporting this shaft a standard 77 is employed which is situated at the center of the said shaft and between the two hand wheels. This standard is constructed at its upper end with a boss 85 through which the shaft 76 extends and is further constructed at its lower end with a base 86 bolted to the web 57 of the transverse frame 56 through bolts 87. The outer ends of the shaft 76 are reduced in diameter and threaded as indicated at 80 to receive nuts 78 which may be screwed upon such portions of the shaft. Brackets 83 welded or bolted to the hood 17 at opposite sides thereof are adapted to receive the threaded ends 80 of the shaft 76. By means of the two nuts 78 the said shaft is secured to the respective brackets and rigidly supported in proper position to journal the two hand wheels.

For the purpose of driving the two wheels 26 and 27, the stub axles 32 and 33 thereof are formed at their ends with cranks 88. These cranks have pivotally connected to the ends thereof forwardly extending longitudinally positioned links 89 and 90. Nuts 180 screwed upon the ends 81 of these cranks hold the links in place. The ends 81 of these cranks are preferably reduced in diameter to form shoulders against which the nuts 180 abut. These links are supported at the forward ends thereof through swinging arms or hangers 91 and 92 being pivoted to said arms through pintles 181. These arms are further pivoted to brackets 93 secured to the underside of the hood 17 through bolts 94. These brackets are situated forwardly of the two hand wheels 67 and 68 and the slot 66 through the said hood. Along the two links 89 and 90 are formed holes 97 by means of which two pedals 98 and 99 may be adjustably attached to said links. When the operator is seated in the seat 20 he may straddle the two hand wheels 67 and 68 and rest his feet upon the two pedals 98 and 99. By manipulating said pedals, force may be exerted on the cranks 88 whereby the wheels 26 and 27 may be independently rotated.

In order to apply further traction to the two driving wheels 26 and 27 the two hand wheels 67 and 68 are employed. For this purpose two other links 100 and 101 are utilized which are pivoted to the two links 89 and 90 through rivets 102. These links are pivoted at their other ends to the two hand wheels 67 and 68 through bolts 103 which extend jointly through the respective hand wheels and links. The distance between the bolts 103 and the axis of the axle 76 is somewhat greater than the length of the crank arm of the cranks 88. By means of this construction the cranks 88 may make a full revolution while the wheels 67 and 68 merely rock in an oscillatory manner about the shaft 76.

In the operation of the device the occupant is seated on the seat 20 with his feet placed on the pedals 98 and 99 and his hands engaging the grip 74 of the two hand wheels 67 and 68. By means of a combined foot and hand movement the hand wheels 67 and 68 are rocked and the links 89 and 90 are reciprocated through the pedals 98 and 99. This causes propulsion of the vehicle. As long as the same force is applied to both wheels the vehicle travels in a forward direction. If, however, a different amount of force is applied to one driving wheel than to the other, the vehicle is caused to travel in a curved direction. The direction of travel can be controlled by controlling the amount of energy applied to the respective wheels. This is mainly accomplished through the two hand wheels 67 and 68. By retarding one of said wheels or by accelerating the movement of the other or by combined movement of both, the relation of the travel of the two wheels can be altered so that the vehicle can be caused to travel in any desired direction. During the propulsion of the vehicle the steering wheel 28 follows along as a caster wheel without attention of the operator.

It will be noted that the links operated by the hand wheels are angularly disposed with respect to the links operated by the foot pedals. By means of this construction the power is applied to the cranks along different lines of action thereby eliminating the so-called "dead center". By the use of two hand wheels for operating the second set of links, power can be had on both strokes of the crank so that the vehicle can be started at any positions of the various cranks. Furthermore the vehicle may be caused to travel in a forward direction or in a rearward direction with the same manipulation of the pedals and hand wheels.

With my invention considerable amusement and entertainment is had by the user of the vehicle. In addition, considerable ingenuity is required to operate the vehicle which is fully controlled through the two driving wheels thereof. By means of the hand wheels employed, steering of the vehicle through the driving wheels is more easily effected than were the operator to rely solely on the use of the foot pedals for this purpose. My invention can be constructed in an extremely neat and attractive manner. With my invention considerably greater speed can be procured than would be possible were only the foot pedals used for propelling the driving wheels. In addition, due to the fact that the two links used for operating the cranks act at different angles, the dead center of the two cranks is eliminated so that power can be applied to the driving wheels at all positions of the crank. By the use of hand wheels power can be applied in a manner to procure both forward and reverse movement of the vehicle.

Changes in the specific form of my invention, as herein disclosed, may be made within the scope of what is claimed without departing from the spirit of my invention.

Having described my invention, what I claim as new and desire to protect by Letters Patent is:

1. In a wheeled vehicle, a driving wheel, a crank for rotating said driving wheel, a link for operating said crank, a hand wheel, said link being eccentrically connected to said hand wheel, the eccentricity of said crank being less than the eccentricity of the connection of said link to said hand wheel.

2. In a wheeled vehicle, a supporting structure, a driving wheel carried thereby, a crank for rotating said driving wheel, a swinging arm pivoted to said supporting structure, a link connected to said arm and to said crank, a foot pedal for operating said link to procure rotation of said crank, a hand wheel, a second link operating said crank and eccentrically connected to said hand wheel, said links having different lines of action.

3. In a wheeled vehicle, a supporting structure, a rear driving wheel carried thereby, a seat carried by said supporting structure forwardly of said driving wheel, a crank for rotating said driving wheel, a swinging arm pivoted to said supporting structure forwardly of said seat, a link connected to said arm and to said crank, a foot pedal for operating said link through the action of the foot of an operator seated on said seat, a hand wheel pivoted to said supporting structure forwardly of said seat, and a second link connected to said hand wheel and operating said crank, said second link having a different line of action than said first link.

4. In a wheeled vehicle, a supporting structure, a rear driving wheel carried thereby, a seat carried by said supporting structure forwardly of said driving wheel, a crank for rotating said driving wheel, a swinging arm pivoted to said supporting structure forwardly of said seat, a link connected to said arm and to said crank, a foot pedal for operating said link through the action of the foot of an operator seated on said seat, a hand wheel pivoted to said supporting structure forwardly of said seat, and disposed between said seat and said arm, and a second link eccentrically connected to said hand wheel and operating said crank.

5. In a wheeled vehicle, a supporting structure, a rear driving wheel carried thereby, a seat carried by said supporting structure forwardly of said driving wheel, a crank for rotating said driving wheel, a swinging arm pivoted to said supporting structure forwardly of said seat, a link connected to said arm and to said crank, a foot pedal for operating said link through the action of the foot of an operator seated on said seat, a swinging member pivoted to said frame, and a link connected to said swinging member and operating said crank, the point of connection of said second named link to said swinging member being above the point of connection of said first named link to said arm.

6. In a wheeled vehicle, a supporting structure, a rear driving wheel carried thereby, a seat carried by said supporting structure forwardly of said driving wheel, a crank for rotating said driving wheel, a swinging member pivoted to said supporting structure forwardly of said seat, a link connected to said crank and to said swinging member, a second swinging member pivoted to said supporting structure and a second link connected to said second swinging member and operating said crank, the point of connection of one of said links with its swinging member being higher than the point of connection of the other of said links with its swinging member.

7. In a wheeled vehicle, a supporting structure, a rear driving wheel carried thereby, a seat carried by said supporting structure forwardly of said driving wheel, a crank for rotating said driving wheel, a swinging arm pivoted to said supporting structure forwardly of said seat, a link connected to said arm and to said crank, a foot pedal for operating said link through the action of the foot of an operator seated on said seat, a hand wheel pivoted to said supporting structure forwardly of said seat, and a second link pivoted to said first named link and to said hand wheel.

8. In a wheeled vehicle, a supporting structure, a rear driving wheel carried thereby, a seat carried by said supporting structure forwardly of said driving wheel, a crank for rotating said driving wheel, a vertically disposed hand wheel pivoted to said supporting structure forwardly of said seat and with the axis thereof transversely of the vehicle, a link eccentrically connected to the lower portion of said hand wheel and operating said crank.

9. In a wheeled vehicle, a supporting structure, a rear driving wheel carried thereby, a seat carried by said supporting structure forwardly of said driving wheel, a crank for rotating said driving wheel, a vertically disposed hand wheel pivoted to said supporting structure forwardly of said seat and with the axis thereof extending transversely of the vehicle, a link eccentrically connected to the lower portion of said hand wheel and operating said crank, the point of connection of the link to the hand wheel being farther from the center of said hand wheel than the length of the crank arm of said crank.

10. In a wheeled vehicle, a supporting structure, a pair of rear driving wheels carried by said supporting structure and independently rotatable, a crank for each of said driving wheels, two hand wheels and a link connected to each of said hand wheels and operating the corresponding crank for applying power to said driving wheels.

11. In a wheeled vehicle, a supporting structure, a pair of rear driving wheels carried by said supporting structure and independently rotatable, a crank for each of said driving wheels, two hand wheels and a link connected to each of said hand wheels and operating the corresponding crank for applying power to said driving wheels through the hands of the operator, and foot operated means for further applying power to said wheels.

12. In a wheeled vehicle, a supporting structure, a pair of rear driving wheels carried thereby and independently rotatable, a crank for operating each of said rear wheels, a seat forwardly of said driving wheels, a pair of vertically disposed eccentrically arranged hand wheels positioned with their axes transversely of the vehicle and forwardly of the seat, and a link connected to each of said hand wheels and operating the corresponding crank for imparting independent rotational movement to each of the driving wheels through each of the respective hand wheels.

13. In a wheeled vehicle, a supporting structure, a pair of rear driving wheels carried thereby and independently rotatable, a crank for operating each of said rear wheels, a seat forwardly of said driving wheels, a pair of vertically disposed eccentrically arranged hand wheels positioned with their axes transversely of the vehicle and forwardly of the seat, a link connected to each of said hand wheels and operating the corresponding crank for imparting independent rotational movement to each of the driving wheels through each of the respective hand wheels, a second link for each of said driving wheels, said second named links operating the respective cranks, means at the forward ends of said links for guiding said links for movement and foot operated means connected with said second named links for further applying power independently to the respective driving wheels.

NELS H. NELSON.